United States Patent [19]

Erwin

[11] Patent Number: 4,692,775

[45] Date of Patent: Sep. 8, 1987

[54] DEVICE TO MONITOR PRESS FITTINGS

[76] Inventor: Edward R. Erwin, 8 Woodbridge Rd., Hamilton, Ontario, Canada, L8K 3C7

[21] Appl. No.: 792,329

[22] Filed: Oct. 28, 1985

[51] Int. Cl.$^4$ .................. G01D 15/16; G01D 9/00
[52] U.S. Cl. .................................... 346/118; 73/792; 73/862.51
[58] Field of Search .................. 346/118, 113, 19; 73/862.51, 792, 793

[56] References Cited

U.S. PATENT DOCUMENTS

| | | | |
|---|---|---|---|
| 951,658 | 3/1910 | Phillips | 346/113 |
| 1,063,281 | 6/1973 | Motherwell | 346/6 |
| 1,072,161 | 9/1913 | Phillips | 44/31 |
| 1,265,156 | 5/1918 | Young | 73/712 |
| 3,304,600 | 2/1967 | Spier | 29/168 |
| 3,457,781 | 7/1969 | Elliot | 73/862.51 |
| 3,527,094 | 9/1970 | Yew | 73/862.51 |

Primary Examiner—E. A. Goldberg
Assistant Examiner—Mark Reinhart
Attorney, Agent, or Firm—Ridout & Maybee

[57] ABSTRACT

Apparatus for monitoring the progress of operations on mechanical components, such as the fitting of railcar wheels to axles, includes a tachometer monitoring motion of the press ram and generating pulses indicative of increments of forward and rearward movement of a press ram, a chart recorder having a pen whose position indicates the pressure applied to the ram, and a stepper motor driving the chart of the recorder, the stepper motor being supplied with stepping pulses proportional to the net forward motion of the ram as calculated from the outputs of the tachometer. Provision is made for predetermined numbers of forward stepping pulses to be supplied to the motor during rearward movement of the ram so as to separate from the chart the traces generated during successive movements of the ram.

5 Claims, 4 Drawing Figures

DEVICE TO MONITOR PRESS FITTINGS

This invention relates to apparatus for monitoring press operations on mechanical components.

A typical application of such apparatus is monitoring the pressing of railcar wheels onto axles. The proper performance of this operation is critical to the subsequent safe operation of a railcar to which the axle is fitted. It has therefore long been a legal requirement that the progress of the pressing operation be monitored and recorded, and the recording checked by an inspector for absence of abnormalities before the axle is certified for use. In view of this requirement, equipment for making the required recording has also been available for many years, and typically consists of a chart recorder having a chart drive mechanically coupled to the press ram so as to move or rotate at a rate proportional to the rate of movement of the ram, and a pressure responsive bellows or Bourdon tube moving a pen over the chart proportionally to the pressure applied to the ram. Examples of such devices, which have provided compliance with official requirements over many years, are disclosed in U.S. Pat. Nos. 951,658 and 1,072,161 (Phillips), issued on Mar. 8, 1910 and Sept. 2, 1913 respectively, U.S. Pat. No. 1,063,281 (Motherwell) issued June 3, 1973, and U.S. Pat. No. 1,265,156 (Young) issued May 7, 1918, whilst an example of an axle assembly plant employing such recorders is disclosed in U.S. Pat. No. 3,304,600 (Spier) issued Feb. 21, 1967 (see column 2, lines 3335, which refer to the unit described in the Motherwell patent). Although such recorders have given long and reliable service, the resolution they provide on both the pressure and distance axes is rather poor, and whilst they provide a sufficiently accurate indication of the maximum pressure developed during pressing of a wheel, they can only indicate gross irregularities in the progress of the pressing application, it being appreciated that both the maximum pressure developed and the smoothness with which this maximum is approached are both indicative of a proper fit of the wheel on the axle. Erratic variations in pressure during the fitting operation are indicative of improper finishing, dimensioning or other flaws in either the wheel or the axle. The movement of the wheel onto the axle tends however to be associated with the development of vibration in the wheel, and a fairly low resolution of the recorder has been necessary to prevent this vibration from showing up as spurious irregularities in the recording, although it also reduces the information content of the recording.

The increasingly serious consequences associated with railcar derailments, and the desirability of keeping down manufacturing costs have been an incentive to provide a recorder which provides greater resolution, both to provide indications of more subtle faults in the fitting, and to enable incipient problems in manufacture to be detected at an early stage. For example, a similar small irregularity in the fitting records of a number of axles may provide early warning of a worn or damaged tool used in preparing the axles or wheels, whilst accurate records can assist in adjusting the settings of machine tools used in the preparation of axles on wheels so as to provide an optimum fit.

Whilst recording pressure gauges of higher resolution are available, these have constant speed, usually electrical, chart drives and could not readily be adapted to the type of chain driven proportional mechanical drive utilized in known instruments. Moreover, such a modified drive would have vibration of the wheel transmitted to it through the mechanical linkage.

A further shortcoming of known recorders is that whilst forward movement of the ram, including the fast initial run-up to the workpiece, is transmitted to the chart, the chart does not move during return movement of the ram, and each record on the chart is therefore separated only by that portion of the trace corresponding to forward movement of the ram whilst no pressure is being applied to the work.

I have now found that a high resolution recording of a press fitting operation can be obtained which is responsive to wanted information on the progress of the fitting operation without responding to vibration, and that provision can be made to separate by different preselected distances records relating to successive pressing operations, according for example to whether they relate to wheels on the same axle, or to different axles.

According to the invention a recorder for monitoring press operations on mechanical components, comprising a chart recorder having a pen driven by a transducer monitoring the pressure applied by a press ram, a chart, and a chart drive operable to displace the chart substantially proportionately to displacement of the press ram, is provided wherein the chart drive is a stepping motor, the press ram is mechanically linked to a displacement decoder providing output signals indicative both of increments of displacement of said ram and the direction of said increments, means being provided for algebraically summing the value of said increments, and also means applying forward stepping pulses to said motor in predetermined proportions to said summed increments.

Preferably the recorder further includes means to discriminate between forward and rearward increments of displacement and to count said increments separately over discrete intervals of time, means to determine whether the totals of said increments in any particular interval exceed predetermined thresholds, and means to prevent stepping pulses being generated in the event that a threshold is exceeded.

Preferably also, means are provided to apply a series of forward pulses to said motor during rearward movement of the ram, whereby to advance the chart a predetermined distance between records.

In the drawings

Figure 3A:
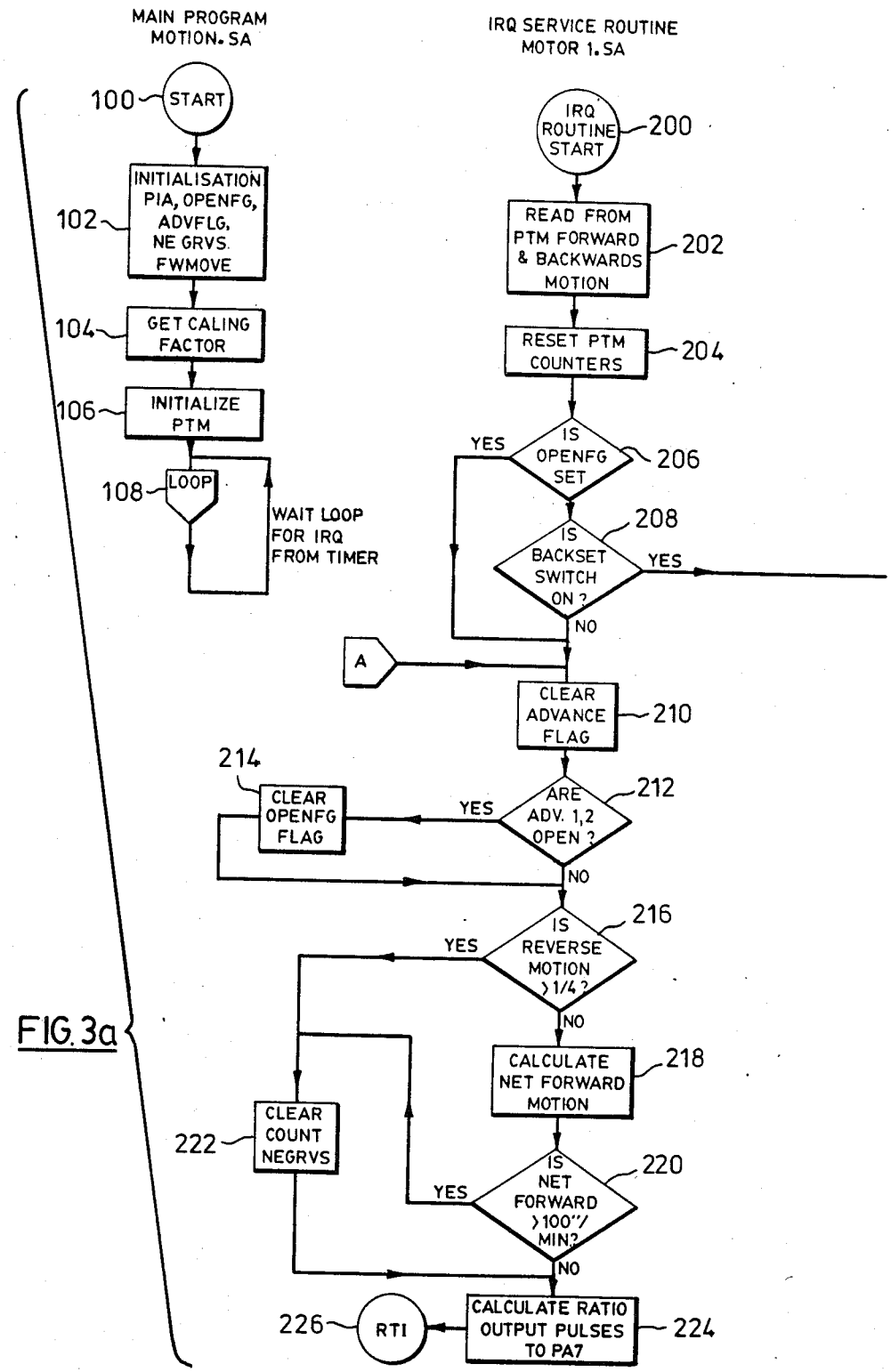

FIGS. 3a & b constitute a flow diagram summarizing essential portions of the program controlling operation of the system.

Referring to the drawings, the apparatus comprises a shaft encoder 2, a pulse discriminator 4 pre-processing the shaft encoder output, a computer unit 6 comprising a central processing unit (CPU) 8, random access memory (RAM) 10, a read only memory (ROM) 12 storing a program described further below, a counter and timer unit (PTM) 14 and a parallel interface adaptor (PIA) 16. This last receives inputs from switches 18, 20 and 22, and a selection panel 24, and provides an output to a stepper motor control unit 28 which controls the application of power from a power supply unit 26 to the phase windings of a stepper motor 30. The stepper motor drives a sprocket drum 32 advancing the chart 34 of a chart recorder 36 having a pen 38 driven over the chart by a pen drive 40 in turn controlled by a pressure transducer 42 associated with the cylinder 44 of a press ram, in this example forming part of a wheel press, the piston 46 of which is mechanically linked to the shaft encoder 2 as shown in more detail in FIG. 2.

Figure 1:
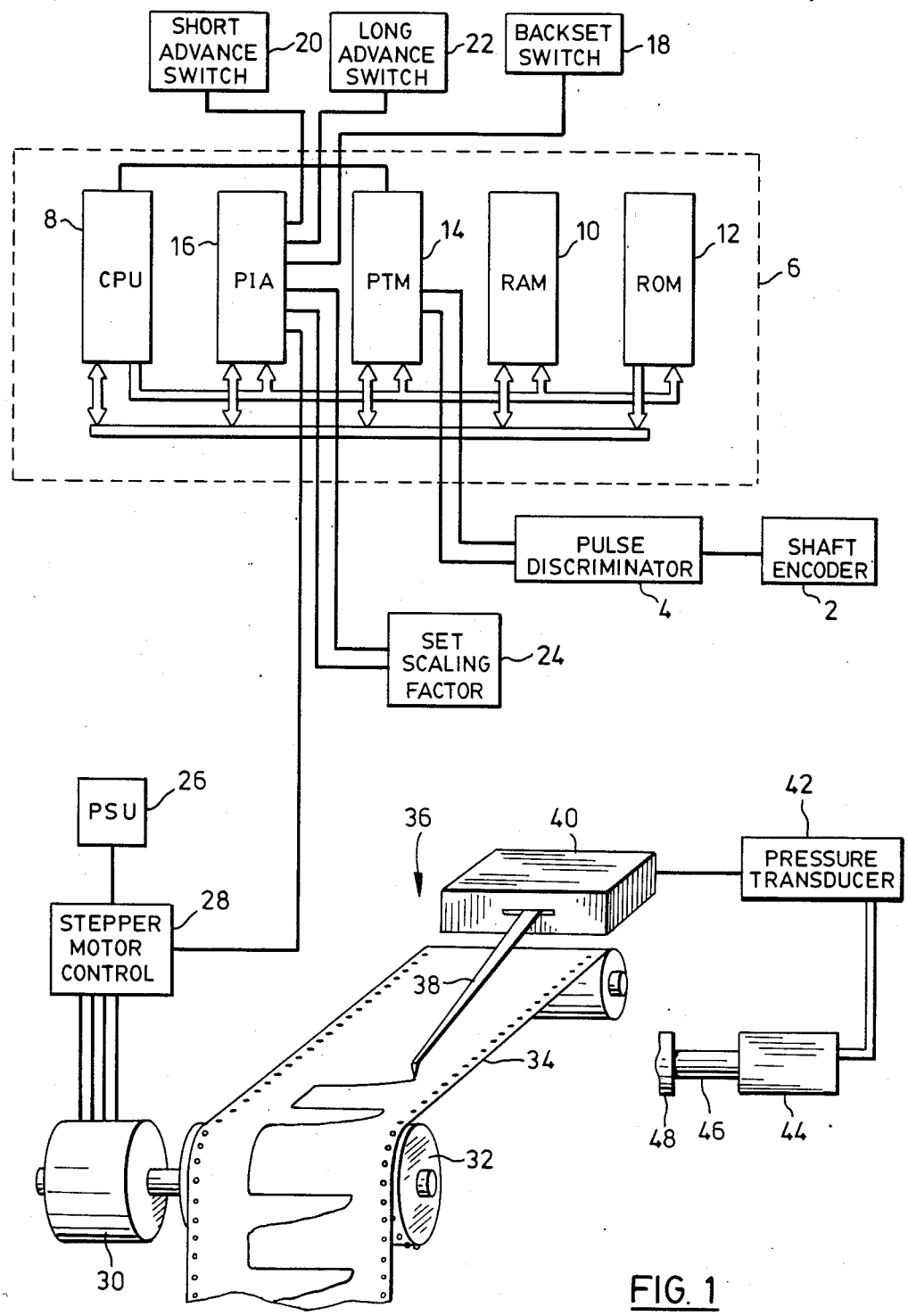
FIG. 1 is a schematic diagram of apparatus in accordance with the invention.
Figure 2:
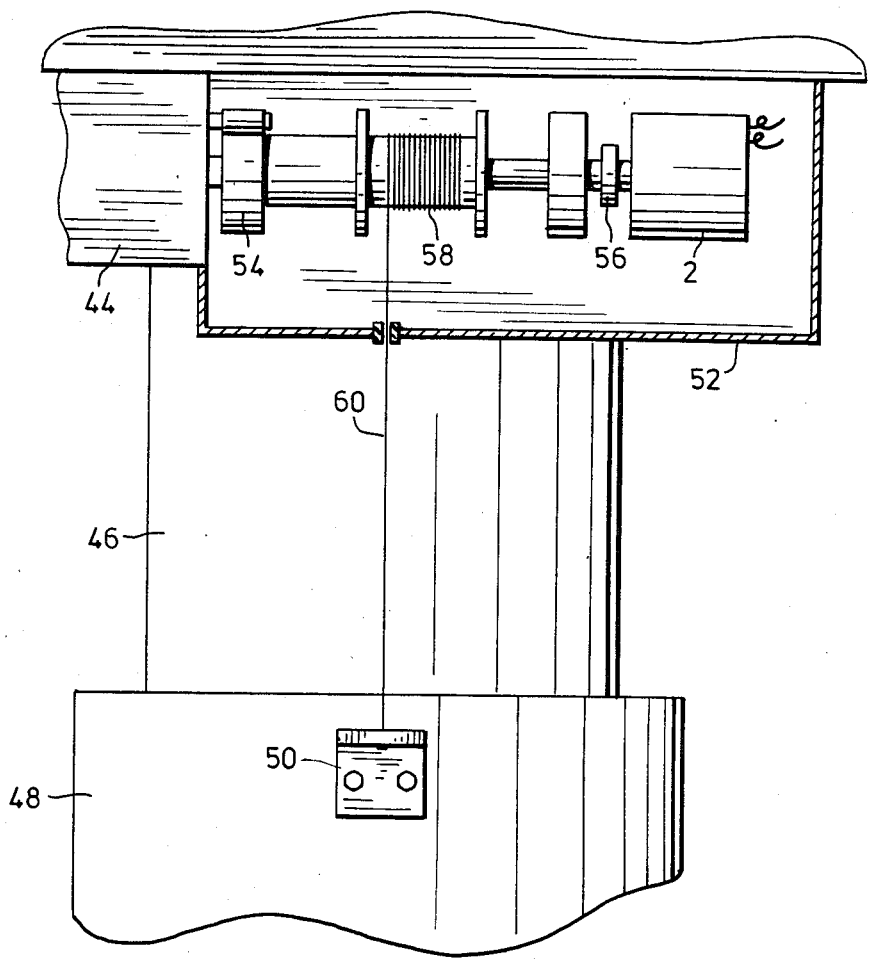
FIG. 2 shows further details of the shaft encoder and associated parts.

Referring to FIG. 2, a bracket 50 is attached to a press member 48 actuated by the piston 46, whilst the encoder 2 is mounted in a housing 52 attached to the cylinder 44. The encoder shaft is attached by an anti-vibration flexible coupling 56 to a winding drum 58, and the shaft is biased in one direction of rotation by a concentric spiral spring 54, whilst a flexible wire cable 50 may be drawn off the drum to rotate the latter against the bias of the spring. The free end of the cable 60 is attached to the bracket 50. The shaft of the encoder 52 is thus rotated proportionately to relative movements of the piston 46 and cylinder 44, although some high frequency vibration will be absorbed by the coupling 56.

The switches 18, 20 are operated in conjunction with the wheel press. The backset switch 18 is closed during withdrawal of the piston 46 to an initial position after a pressing operation. The short advance switch is closed between pressing on the first and second wheels on a particular axle. The long advance switch 22 is closed between pressing operations on successive axles. The selection panel 24 is jumpered to pull down a particular combination of input lines to the PIA indicative of a desired scaling relationship between movement of the piston 46 and movement of the chart 34 during a pressing operation.

Figure 3B:
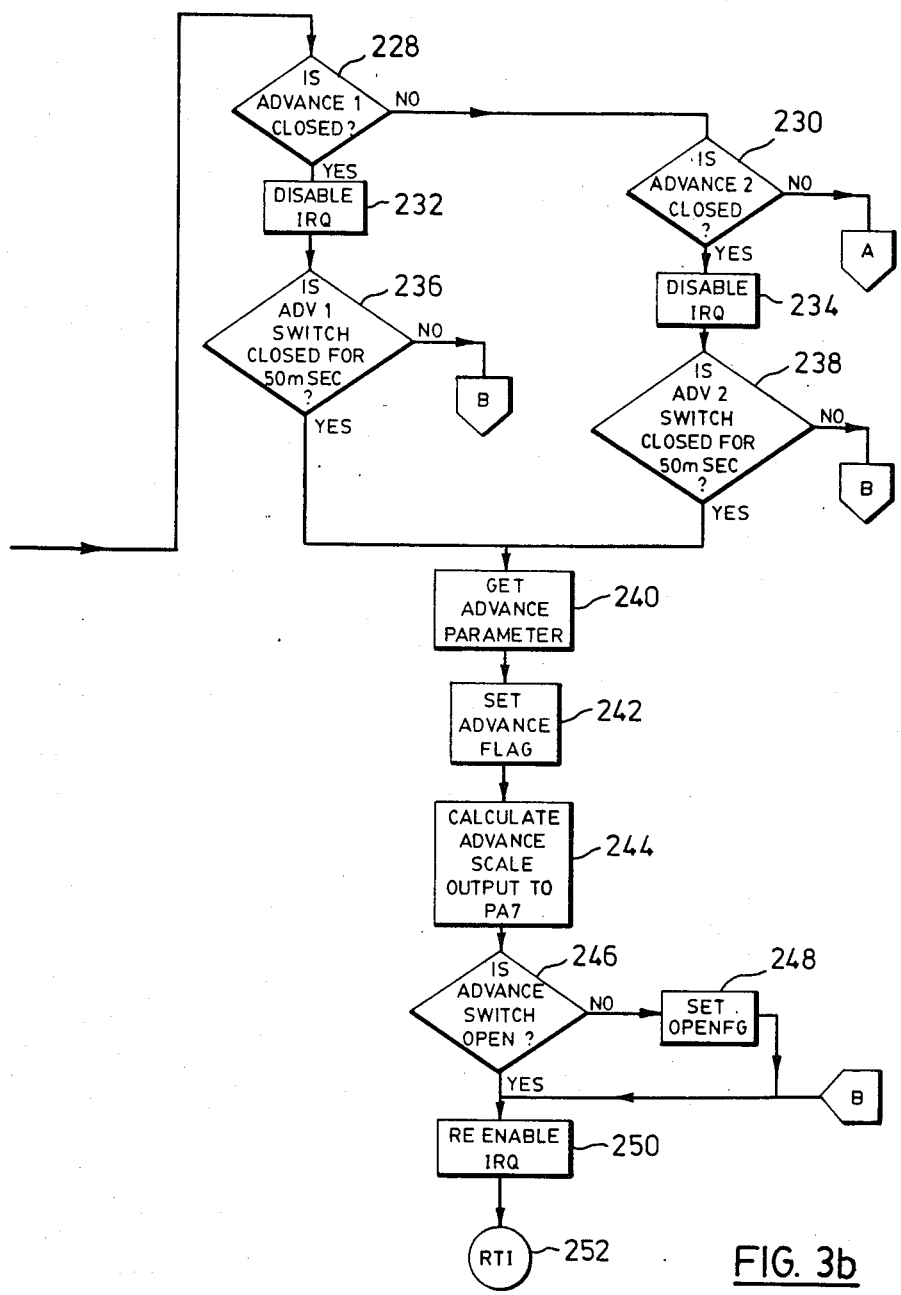

Operation of the apparatus will now be described with reference to FIG. 3. Upon applying power to the computer unit 6, the CPU 8 is reset and commences executing a main program MOTION.SA stored in ROM 12 at the START point 100 in FIG. 3. The step 102 initializes the PIA 16, and sets up flags including a flag OPENFG indicating whether the switches 20 and 22 are both open and a flag ADVFLG indicating whether rapid advance of the chart is required, as well as setting up storage for two parameters NEGRVS and FWMOVE. The step 104 gets the scaling factor as set at the panel 24 and step 106 initializes the PTM, setting up first and second counters to count pulses from the pulse discriminator 14, which outputs pulses to different inputs of the PTM according to whether the motion sensed by the encoder 2 is forward or backward, and further a third counter to count clock pulses from the microprocessor. The program then enters a wait loop 108 awaiting an interrupt from the PTM 14, which generates such an interrupt each time the third counter reaches a predetermined count, representing for example 200 ms.

On receipt of an interrupt, an interrupt service routine MOTOR1.SA is called from the start point 200. This routine at 202 reads the forward and rearward pulse counts from the first and second counters in the PTM and stores these as FWMOVE and NEGRVS, and at 204 resets the counters. The status of OPENFG is tested at 206, and if it indicates that either of the switches 20 and 22 is closed, the condition of the backset switch 18 is also tested at 208. If the latter is closed, the routine branches to a subroutine described later. Otherwise, the advance flag ADVFLG is cleared at 210, and if a test 212 of the condition of switches 20 and 22 shows these to be open, the flag OPENFG is also cleared at 214. A test 216 is then carried out on the reverse pulse count in NEGRVS to determine whether it represents a reverse movement of the ram in excess of, for example, a quarter of an inch, which is in excess of any reverse movement which could normally occur through vibration, failing which the net forward motion of the ram is calculated by subtracting NEGRVS from FWMOVE. The result is tested at 220 to ascertain whether it represents a forward movement in excess of, for example, 100 inches per minute. It is assumed that any excess forward or rearward movement detected by these tests is associated either with fast forward run up motion of the ram, or with overall rearward motion of the ram, neither of which need be recorded, in which case the stored counts are cleared by step 222 before proceeding to step 224. In step 224, the net forward movement is divided by the ratio set by panel 24, and the result determines the number of pulses output by the PIA on a line PA7 to the stepper motor control 28, whereafter a return-from-interrupt instruction returns the program counter of the CPU to step 108 of the main program MOTION.SA to await the next interrupt.

Thus every 200 ms, a string of stepping pulses is applied to the stepper motor control 28 to drive the chart at a rate which is proportional to the rate of net forward movement of the ram, the separate counting and subsequent summing of the forward and reverse tachometer pulses acting to filter out vibratory components in the movement of the ram. Moreover, the exclusion of rapid forward movements of the ram and large rearward movements means that the chart is advanced only during the actual pressing operation, and rapid movements of the ram during runup portions of the pressing operation do not actuate the recorder.

All this of course assumes that the routine has not been caused to branch by the test at step 208, i.e., that the backset switch 118 is not closed.

The backset switch 118 is closed whilst the ram is withdrawn to its initial position after a press operation. In order to separate the recordings of successive press operations, it is desirable to advance the chart between recordings, preferably by a smaller distance between the pressing of two wheels on the same axle, and a larger distance between axles. One of the switches 20 and 22, named ADVANCE 1 and ADVANCE 2, is closed depending on which distance is required. On detecting closure of the backset switch, the program carries out a test 228 and, if test 228 is negative, a test 230, for closure of the switches 20 and 22 respectively. If neither switch is closed, the routine jumps to step 210, and will proceed as already described, although if the ram is moving rearwardly, no pulses will be sent to the stepping motor and the chart will remain stationary.

If a switch closure is detected, the interrupts are disabled at step 232 or 234, and a test is carried out at step 236 or 238 to determine whether the switch has remained closed for at least 50 ms, failing which the routine jumps to step 250, re-enables the interrupts and exits at step 252. Assuming that closure is verified, a scaling factor set by panel 24 is fetched at step 240, the ADVANCE flag is set at step 242, the distance to be advanced is calculated at step 244, using data from the ROM 12 and the scaling factor, and the appropriate number of pulses are output via line PA7 to the stepping motor control unit 28 so as to advance the chart the required distance. At steps 246 and 248, the routine checks whether or not both switches 20 and 22 are open and sets the flag OPENFG accordingly, before reaching step 250 and returning from the interrupt service routine at step 252.

It will be noted that the operation of the unit is such that it can discriminate between forward movements of the ram associated with the actual progress of a pressing operation, and other measurement of the ram, and only the former will result in movement of the chart, although the chart may be advanced through predetermined distances between pressing operations in order to separate and improve presentation of the records.

It will be appreciated that all times and dimensions quoted above are exemplary only and may be varied to suit the application. Likewise, whilst the application of the apparatus to monitoring the fit of railcar wheels on axles has been described, the invention may be applied to the monitoring of other pressing and related operations in which a pressure/distance relationship provides useful information as to the progress and success of the operation.

I claim:

1. A recorder for monitoring press operations on mechanical components, comprising a chart recorder having a pen driven by a transducer monitoring pressure applied by a press ram, a chart, and a chart drive operable to displace the chart substantially proportionately to displacement of the press ram, wherein the chart drive is a stepping motor, the press ram is mechanically linked to a displacement decoder providing output signals indicative both of increments of displacement of said ram and the direction of said increments, said recorder further including means receiving said signals for algebraically summing the value of said increments over discrete intervals of time, and means for applying forward stepping pulses to said motor in predetermined proportions to said increments summed in each said discrete interval.

2. A recorder according to claim 1, further including means to discriminate between forward and rearward increments of displacement and means to count said increments separately over discrete intervals of time.

3. A recorder according to claim 2, further including means to determine whether the respective totals of said forward and rearward increments in any particular interval exceeds predetermined thresholds, and means to prevent stepping pulses being generated proportional to the algebraic sum of the increments in the event that a threshold is exceeded.

4. A recorder according to claim 1, further including means to apply a series of forward pulses to the stepping motor during rearward movement of the ram, whereby the chart is advanced a predetermined distance.

5. A recorder according to claim 4, applied to a press for pressing railcar wheels onto axles, and including means to apply different numbers of forward pulses according to whether the ram is being withdrawn between pressing wheels onto the same axle, or wheels onto different axles.

* * * * *